United States Patent
Jung et al.

(10) Patent No.: US 8,346,545 B2
(45) Date of Patent: Jan. 1, 2013

(54) MODEL-BASED DISTORTION COMPENSATING NOISE REDUCTION APPARATUS AND METHOD FOR SPEECH RECOGNITION

(75) Inventors: Ho Young Jung, Daejeon (KR); Byung Ok Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 666 days.

(21) Appl. No.: 12/626,548

(22) Filed: Nov. 25, 2009

(65) Prior Publication Data

US 2011/0077939 A1 Mar. 31, 2011

(30) Foreign Application Priority Data

Sep. 30, 2009 (KR) .................. 10-2009-0092779

(51) Int. Cl.
*G10L 15/20* (2006.01)
(52) U.S. Cl. .................. 704/226; 704/233; 704/215
(58) Field of Classification Search ............. 704/226, 704/227, 228, 208, 210, 214, 215, 233, 205
See application file for complete search history.

(56) References Cited

U.S. PATENT DOCUMENTS

| | | | | |
|---|---|---|---|---|
| 8,131,543 B1* | 3/2012 | Weiss et al. | ................... | 704/233 |
| 8,244,523 B1* | 8/2012 | Murphy | ........................ | 704/205 |
| 2009/0132245 A1 | 5/2009 | Wilson et al. | | |

FOREIGN PATENT DOCUMENTS

| | | |
|---|---|---|
| JP | 2008-035356 | 2/2008 |
| KR | 10-2007-0085193 A | 8/2007 |
| KR | 10-2009-0056598 A | 6/2009 |

* cited by examiner

*Primary Examiner* — Huyen X. Vo

(57) ABSTRACT

A model-based distortion compensating noise reduction apparatus for speech recognition, includes: a speech absence probability calculator for calculating the probability distribution for absence and existence of a speech using the sound absence and existence information for the frames; a noise estimation updater for estimating a more accurate noise component by updating the variance of the clean speech and noise for each frame; and a speech absence probability-based noise filter for outputting a first clean speech through the speech absence probability transmitted from the speech absence probability calculator and a first noise filter. Further, the model-based distortion compensating noise reduction apparatus includes a post probability calculator for calculating post probabilities for mixtures using a GMM containing a clean speech in the first clean speech; and a final filter designer for forming a second noise filter and outputting an improved final clean speech signal using the second noise filter.

20 Claims, 3 Drawing Sheets

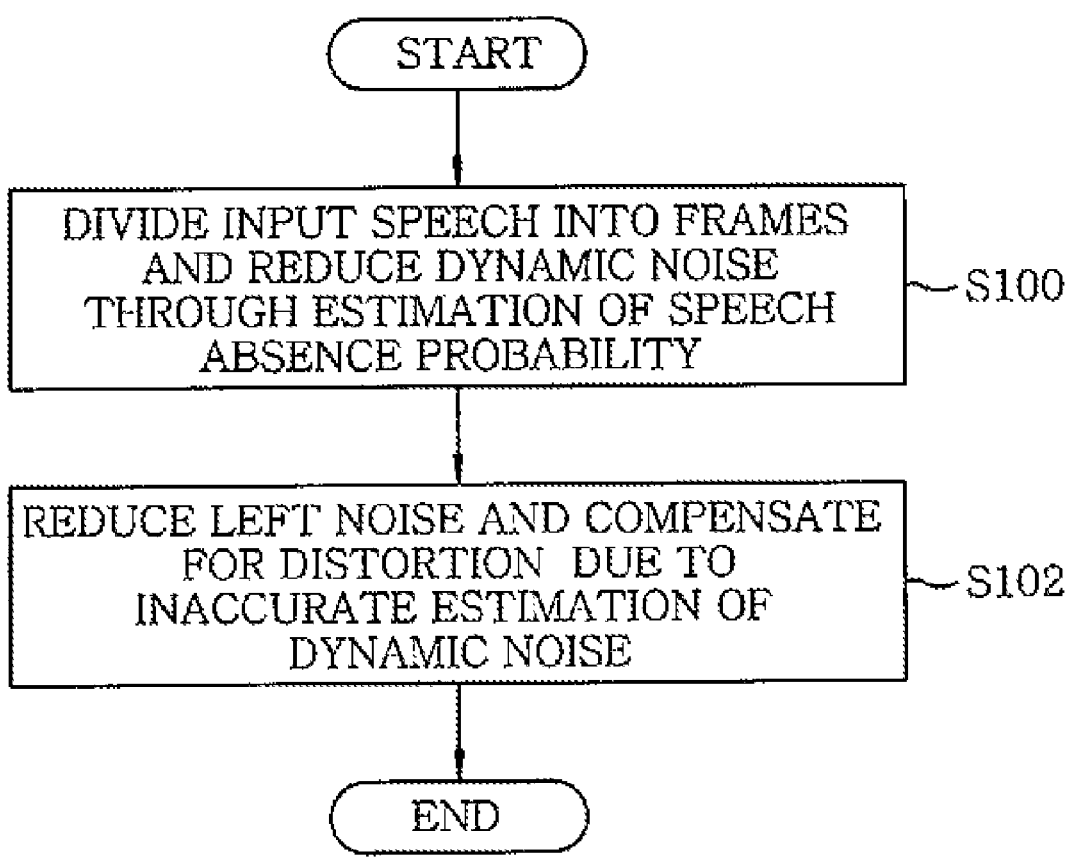

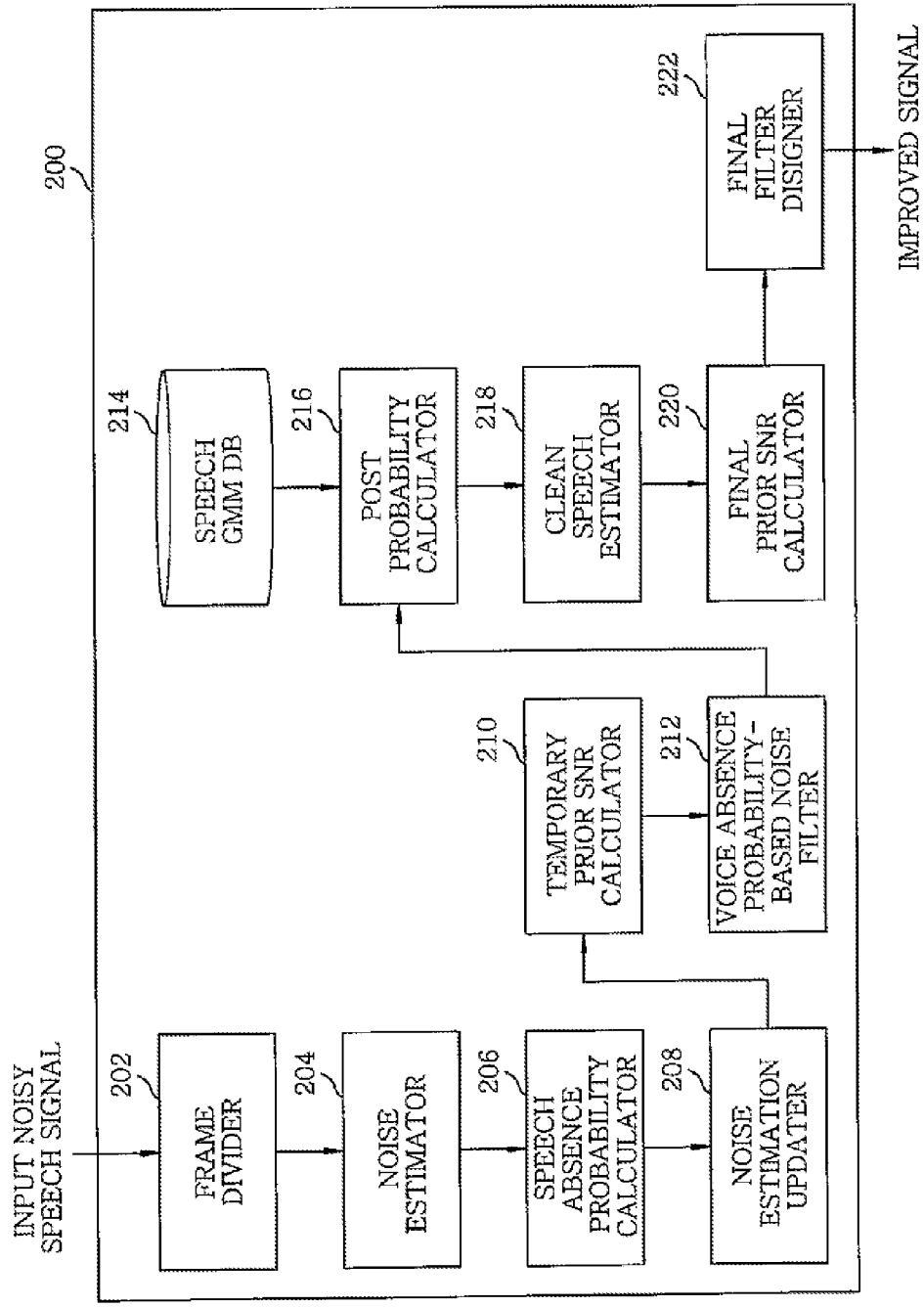

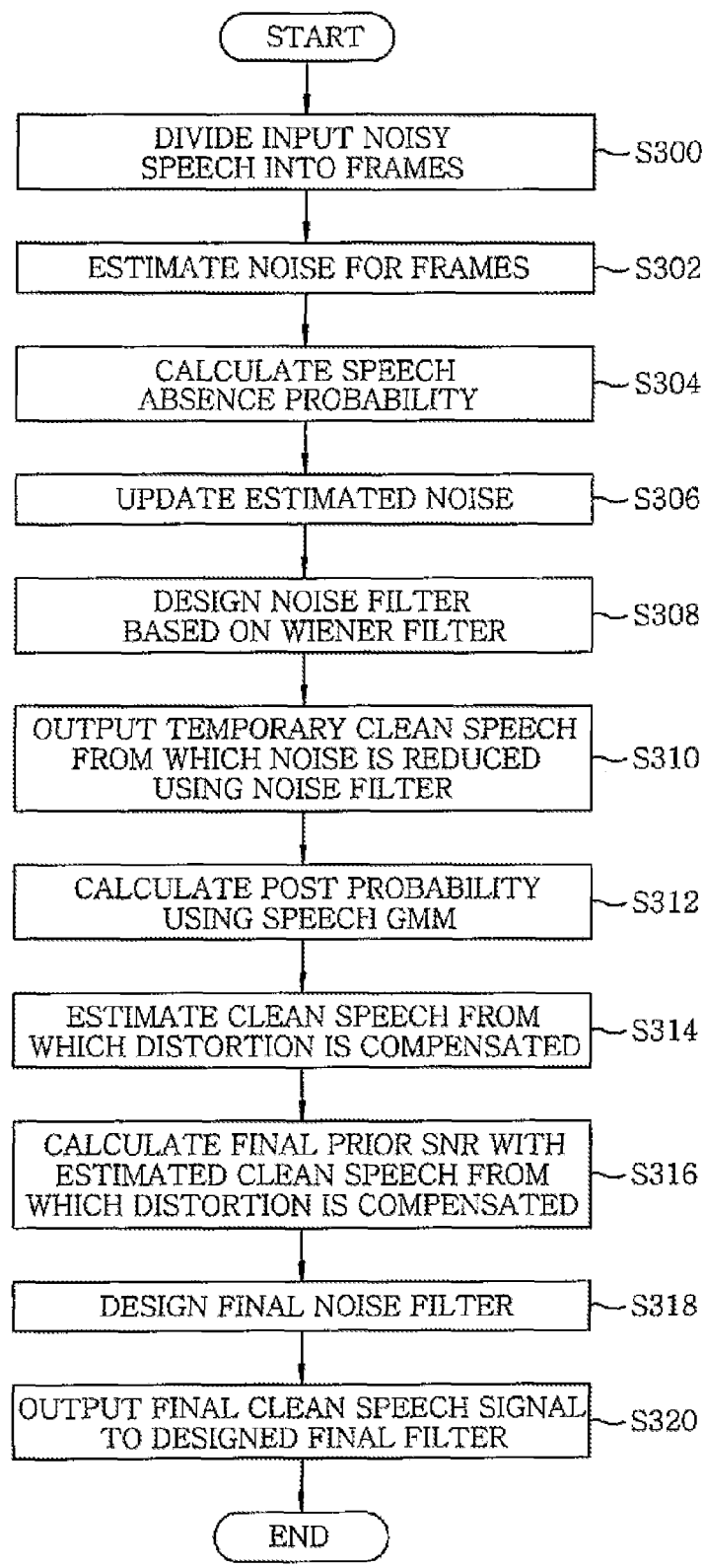

MODEL-BASED DISTORTION COMPENSATING NOISE REDUCTION APPARATUS AND METHOD FOR SPEECH RECOGNITION

CROSS-REFERENCE TO RELATED APPLICATIONS

The present invention claims priority of Korean Patent Application No. 10-2009-0092779, filed on Sep. 30, 2009, which is incorporated herein by reference.

FIELD OF THE INVENTION

The present invention relates to a noise processing technology for speech recognition; and more particularly, to a model-based distortion compensating noise reduction apparatus and method for speech recognition, which are suitable for both reducing noise contained in an input noisy speech signal and minimizing the distortion of the speech signal to secure the performance of a speech recognition system in a noisy environment.

Further, the present invention reduces noise without causing distortion of a speech signal, unlike a conventional method of allowing a human being to easily recognize for speech communication through a one channel noise processing technology, to solve dynamic noise whose characteristic varies over time and effectively reduce noise components existing within a speech section.

In order to commercialize a speech recognition system that operates in this manner, it is essential to reduce a variety of noise generated in an environment that uses a recognizer. Of various noise reduction methods, a method of using one microphone is simple and is apt to be applied to various devices. In particular, a one channel noise processing method of reducing noise using one microphone signal is the basic of various noise processing technologies, and a noise processing technology using a multi-channel microphone also requires a one channel noise processing technology as a post process.

BACKGROUND OF THE INVENTION

The technologies for enhancing the sound quality of a speech signal generated in a noisy environment have numerous application fields, and have been actively studied until now as a research field having enormous potential value.

The application fields of a sound quality enhancing technology include, for example, speech coding, teleconference, hands-free mobile telephony, hearing aids, speech recognition, etc. The sound quality of a speech and the recognition characteristic for clarity of a human being tend to depend on the magnitude of a spectrum for a short time and are relatively insensible to the phase of a speech signal. Based on the characteristics, the current sound quality enhancing technology has focused on suppressing noise added to a speech signal.

As described above, the conventional technology is mainly intended to improve the sound quality of a noisy speech for speech communication, and thus causes the improved speech to be distorted. Although the distortion hampers further enhancement in the performance of speech recognition, many speech recognition systems employ such technology. Such a conventional technology is based on a Wiener filter or a Kalman filter and is effective in removing static noise, but is more vulnerable to distortion when it faces more noise and can not cope with dynamic noise.

Therefore, in the conventional noise reduction method that operates in this way, distortion is caused when improving sound quality and improvement of sound quality is not directly connected to the performance of speech recognition.

Further, the conventional single channel noise processing technology is effective in removing static noise but has a limit in removing dynamic noise whose characteristic varies over time.

SUMMARY OF THE INVENTION

In view of the above, the present invention provides a model-based distortion compensating noise reduction apparatus and method for speech recognition, which are capable of minimizing distortion of an input speech signal while reducing noise of the speech signal for speech recognition.

Further, the present invention provides a model-based distortion compensating noise reduction apparatus and method for speech recognition, which are capable of dividing an input speech into frames of a predetermined length, estimating speech absence probabilities for the respective frames, and processing noise left in a temporary clean signal obtained by designing a filter for reducing dynamic noise based on the estimation result and distortion contained due to inaccurate estimation of the dynamic noise.

In accordance with a first aspect of the present invention, there is provided a model-based distortion compensating noise reduction apparatus for speech recognition, the apparatus including: a speech absence probability calculator for calculating the probability distribution for absence and existence of a speech by using the sound absence and existence information for frames; a noise estimation updater for estimating a more accurate noise component by updating the variance of the clean speech and noise for each frame; a speech absence probability-based noise filter for outputting a first clean speech through the speech absence probability transmitted from the speech absence probability calculator and a first noise filter; a post probability calculator for calculating-post probabilities for mixtures using a Gaussian mixture model (GMM) containing a clean speech in the first clean speech; and a final filter designer for forming a second noise filter and outputting an improved final clean speech signal using the second noise filter.

In accordance with a second aspect of the present invention, there is provided a model-based distortion compensating noise reduction method for speech recognition, the method including: calculating the probability distribution for absence and existence of a speech by using the sound absence and existence information for the frames; estimating a more accurate noise component by updating the variance of the clean speech and noise for each frame; outputting a first clean speech through the speech absence probability transmitted from the speech absence probability calculator and a first noise filter; calculating post probabilities for mixtures using a GMM containing a clean speech in the first clean speech; and forming a second noise filter and outputting an improved second clean speech signal using the second noise filter using a clean speech estimation value obtained through the post probabilities.

In accordance with the present invention, it is possible to solve dynamic noise whose characteristic varies over time and effectively filter noise components existing within a speech section, by reducing noise without causing distortion of a speech signal, unlike a conventional method of allowing a human being to easily recognize for speech communication through a one channel noise processing technology.

BRIEF DESCRIPTION OF THE DRAWINGS

The objects and features of the present invention will become apparent from the following description of preferred embodiments, given in conjunction with the accompanying drawings, in which:

FIG. 1 shows a flowchart for explaining a noise reduction procedure using a noise filter in accordance with an embodiment of the present invention;

FIG. 2 illustrates a block diagram of the configuration of a model-based distortion compensating noise reduction apparatus in accordance with the embodiment of the present invention; and FIG. 3 provides a flowchart for explaining an operation procedure of the model-based distortion compensating noise reduction apparatus in accordance with the embodiment of the present invention.

DETAILED DESCRIPTION OF THE EMBODIMENTS

Embodiments of the present invention will be described in detail with reference to the accompanying drawings which form a part hereof.

FIG. 1 is a flowchart illustrating a noise reduction procedure using a noise filter in accordance with an embodiment of the present invention.

Referring to FIG. 1, in step S100, a noise processing process of dividing a speech input to a noise filter into frames of a predetermined length to estimate speech absence probabilities of the respective frames, and reducing dynamic noise based on the estimation result is performed.

Next, in step S102, a distortion compensating process of processing distortion due to inaccurate estimation of noise left in a temporary clean signal and dynamic noise obtained in the noise processing process is performed.

As described above, in the embodiment of the present invention, reduction of dynamic noise and compensation of distortion are simultaneously performed through the continuous two processes of reducing noise and compensating for distortion, thereby performing one channel noise processing suitable for speech recognition.

More specifically, in step S100, speech absence probabilities are calculated for respective frames to design a noise filter. In general, speeches and noises are independently generated, and when absence of a speech is indicated by $H_0$ and existence of a speech is indicated by $H_1$, the probability distribution for absence and existence of a speech is expressed by Eq. 1 as follows:

$$p(Y_k(t) \mid H_0) = \frac{1}{\pi \lambda_{n,k}(t)} \exp\left[\frac{|Y_k(t)|^2}{\lambda_{n,k}(t)}\right]$$

$$p(Y_k(t) \mid H_1) = \frac{1}{\pi(\lambda_{n,k}(t) + \lambda_{n,k}(t))} \cdot \exp\left[-\frac{|Y_k(t)|^2}{\lambda_{x,k}(t) + \lambda_{n,k}(t)}\right],$$ Eq. 1 wherein $Y_k(t)$ denotes an input noisy speech for the k-th frequency bin of the t-th frame, and $\lambda_{x,k}(t)$ and $\lambda_{n,k}(t)$ denote variances of a clean speech and noise for the k-th frequency bin.

A speech absence probability using the above two equations is expressed by Eq. 2:

$$p(H_0 \mid T(t)) = \frac{1}{1 + \frac{1-q}{q} \sum_{k=1}^{K} \frac{1}{1+\varepsilon_k(t)} \exp\left[\frac{\gamma_k(t)\varepsilon_k(t)}{1+\varepsilon_k(t)}\right]},$$ Eq. 2 wherein q refers to a prior speech absence probability which is a constant, $\varepsilon_k(t)$ is $\lambda_{x,k}(t)/\lambda_{n,k}(t)$, and $\gamma_k(t)$ is $|Y_k|^2/\lambda_{n,k}(t)$. Thus, the accuracy of the speech absence probability needs to be higher to estimate dynamic noise, and a noise estimation updating process of updating variances of clear speeches and noises for every frame is necessary to obtain the speech absence probability more accurately, which can be expressed by Eq. 3 as follows:

$$\hat{\lambda}_{x,k}(t+1) = \alpha_x \hat{\lambda}_{x,k}(t) + (1-\alpha_x) E[|X_k(t)|^2 \mid Y(t)]$$

$$\hat{\lambda}_{n,k}(t+1) = \alpha_n \hat{\lambda}_{n,k}(t) + (1-\alpha_n) E[|N_k(t)|^2 \mid Y(t)]$$ Eq. 3, wherein a variance of noise becomes a final estimation value for noise and is applied to the following noise processing process. Therefore, it is further necessary to efficiently update noise variances for temporal frames. To achieve this, it is devised that a smoothing parameter used for noise updating is adapted over time. The smoothing parameter over time can be expressed by Eq. 4 as follows:

$$\alpha_n(t) = 1 - F_d |\overline{\gamma}(t-1) - 1| P(H_0 \mid Y(t))$$ Eq. 4.

When the characteristic of noise is rapidly changed according to time, the value of $\alpha_n(t)$ decreases so that the value of the current frame is relatively more reflected. In Eq. (4), $F_d|\overline{r}(t-1)-1|$ has a value changing depending on a situation based on $(1-\alpha_n)$, and $\alpha_n$ may be a value between 0 and 1.

The noise filter is designed based on a Wiener filter with the speech absence probability and noise estimation being performed. The magnitude of a speech spectrum estimated from the input noisy speech is given as:

$$\hat{A}_k(t) = E[A_k(t) \mid Y(t), H_0] p(H_0 \mid Y(t)) +$$
$$E[A_k(t) \mid Y(t), H_1] p(H_1 \mid Y(t))$$
$$\cong [G_m p(H_0 \mid Y(t)) + G_{wf,k}(t) p(H_1 \mid Y(t))],$$ Eq. 5 wherein $G_{wf,k}(t)$ is based on a conventional Wiener filter and $G_m$ represents the minimum value maintained during absence of a speech. Here, the previously obtained speech absence probability can be applied to design a suitable filter depending on existence of noise over time and is effectively utilized to filter dynamic noise. In particular, unexpected noise that has not been processed by the conventional Wiener filter can be removed by applying $G_m$.

However, the noise that changes over time cannot be accurately estimated, and since the noise filter is designed based on inaccurate noise, distortion is caused after reducing noise using the noise filter. Thus, the output obtained by Eq. 5 can be determined to be a temporary clean speech containing the distortion.

Therefore, $G_{wf,k}(t)$ based on the Wiener filter in Eq. 5 is given as follows:

$$G_{wf,k}(t) = \frac{\eta_k(t)}{1+\eta_k(t)},$$

and the performance of the filter depends on a prior signal-to-noise ratio (SNR) $\eta_k(t)$. Since this process is performed to obtain a temporary clean speech, the prior SNR is defined as a temporary prior SNR and can be obtained by Eq. 6 as follows:

$$\eta_k(t) = \alpha \frac{\tilde{A}_k^2(t-1)}{\lambda_{n,k}(t-1)} + (1-\alpha)P[\gamma_k(t)-1], \quad \text{Eq. 6}$$

wherein $\tilde{A}_k(t-1)$ represents a final clean speech obtained through the two steps 100 and 102 from a previous frame, and the smoothing parameter $\alpha$ generally has a value of 0.95 to 0.98.

In step S102, a final clean speech signal is obtained by further reducing noise left in the temporary clean speech signal while reducing the distortion component generated in the temporary clean speech signal obtained in step S100.

However, it is difficult to accurately estimate the noise mixed in a speech section, and thus the temporary clean speech signal has a small deviation in a space in which actual speeches are distributed, making it difficult to avoid distortion. Therefore, in order to decrease such distortion, a generated deviation is compensated for by using a statistics model that has been obtained in advance by a clean speech database. The statistics model about a clean speech is given as a Gaussian mixture model (hereinafter, referred to as 'GMM'), and can be expressed by Eq. 7 as follows for a power spectrum region:

$$p(A^2) = \sum_{m=1}^{M} p(m)p(A^2|m) \quad \text{Eq. 7}$$

$$p(A^2|m) = \prod_{k=1}^{K} p_k(A_k^2|m),$$

wherein A represents a clean speech used in a training, M represents the number of mixtures, and K represents the number of the entire frequency bins. Further, p(m) denotes probabilities for the mixtures, and $p_k(A_k^2|m)$ is given in the Gaussian distribution $N(A^2_k; \mu_{m,k}, \sigma_{m,k})$.

In order to recognize that the temporary clean speech estimated in step S100 has how much distortion for a given GMM, the post probabilities for the mixtures are calculated by Eq. 8 as follows:

$$p(m|\hat{A}^2) = \frac{p(m)\prod_{k=1}^{K} p_k(\hat{A}_k^2|m)}{\sum_{m=1}^{M} p(m)\prod_{k=1}^{K} p_k(\hat{A}_k^2|m)}. \quad \text{Eq. 8}$$

The temporary clean speech represents the probabilities for the mixtures, and the probabilities move the temporary clean speech to a clean speech distribution region using an average value of the mixtures whose probabilities are larger than a preset value. This process is a distortion compensating process, which may be expressed as:

$$E[\tilde{A}_k^2] = \sum_{m=1}^{M} p(m|\hat{A}^2)\mu_{m,k}. \quad \text{Eq. 9}$$

In Eq. (9), as the post probabilities become larger, the mixtures are closer to the temporary clean speech, and a clean speech estimation value whose distortion is removed is obtained by compensating for the temporary pure speech, by adding the average value of the mixtures to a preset weight. A final clean speech can be obtained by the following Eq. 10 based on the Wiener filter using the obtained clean speech estimation value.

$$\tilde{A}_k(t) = \frac{\tilde{\eta}_k(t)}{1+\tilde{\eta}_k(t)}|Y_k(t)|, \quad \text{Eq. 10}$$

wherein $\tilde{\eta}_k(t)$ represents a final prior SNR and is expressed by the following Eq. 11:

$$\tilde{\eta}_k(t) = \beta \frac{\tilde{A}_k^2(t-1)}{\lambda_{n,k}(t-1)} + (1-\beta)P\left[\frac{E[\tilde{A}_k^2(t)]}{\tilde{\lambda}_{n,k}(t)} - 1\right], \quad \text{Eq. 11}$$

wherein $\beta$ is a smoothing parameter and may have a value of 0.92 to 0.95.

FIG. 2 is a block diagram illustrating the configuration of the model-based distortion compensating noise reduction apparatus in accordance with an embodiment of the present invention.

Referring to FIG. 2, the model-based distortion compensating noise reduction apparatus 200 includes a frame divider 202, a noise estimator 204, a speech absence probability calculator 206, a noise estimation updater 208, a temporary prior SNR calculator 210, a speech absence probability-based noise filter 212, a speech GMM DB 214, a post probability calculator 216, a clean speech estimator 218, a final prior SNR calculator 220, and a final filter designer 222. Here, a first noise filter (not shown) includes the frame divider 202, the noise estimator 204, the speech absence probability calculator 206, the noise estimation updater 208 and the temporary prior SNR calculator 210 and a speech absence probability-based noise filter 212. Further, a second noise filter (not shown) includes a speech GMM DB 214, a post probability calculator 216, a clean speech estimator 218, a final prior SNR calculator 220, and a final filter designer 222.

To be more specific, the first noise filter divides a speech input to the first noise filter into frames of a predetermined length to estimate speech absence probabilities of the respective frames, and filters dynamic noise based on the estimation result. The first noise filter uses a clean speech obtained from a previous frame and a first prior signal-to-noise ratio calculated using a preset smoothing parameter value. Further, the second noise filter performs a distortion compensating process of processing distortion due to inaccurate estimation of noise left in a temporary clean signal and dynamic noise obtained in the noise processing process. The second noise filter uses the clean speech calculated through a previous frame, a variance ratio of the clean speech to noise, and a second prior signal-to-noise ratio calculated using the preset smoothing parameter value.

Further, the frame divider 202 converts an input noisy speech signal into a digital signal and then divides the digital signal into frames of a predetermined length, and the noise estimator 204 estimates noise components for the divided frames.

Information in which the noise components are estimated is transmitted to the speech absence probability calculator 206, and the probability distribution (Eq. 1) for absence and existence of a speech can be obtained by using the information in which the noise components are estimated, that is, the sound absence and existence information for the frames, and the speech absence probability (Eq. 2), which is the existence probability of the speech for the current frame can be calculated based on the probability distribution.

The noise estimation updater 208 serves to estimate dynamic noise by increasing the accuracy of the speech absence probability, in which a more accurate noise component is estimated by updating the variance of the clean speech and noise for each frame.

The temporary prior SNR calculator 210 calculates a temporary prior SNR applied to a first noise filter using Eq. 6, which is then transmitted to the speech absence probability-based noise filter 212.

The speech absence probability-based noise filter 212 is for obtaining a temporary clean speech containing distortion, and can filter and output the temporary clean speech through a first noise filter which is improved further than the conventional Wiener filter based on the speech absence probability transmitted from the speech absence probability calculator 206 and the Wiener filter containing the temporary prior SNR, as in Eq. 5.

The output temporary clean speech is then transferred the post probability calculator 216. The post probability calculator 216 calculates post probabilities for the mixtures of the speech GMM DB 214 using Eq. 8, in order to compensate for the temporary clean speech having a deviation in a space in which the actual speech is distributed by the generated deviation using the speech GMM DB 214 containing the data for a clean speech.

Next, the clean speech estimator 218 can obtain a clean speech estimation value from which distortion is removed, by moving the temporary clean speech to a speech distribution region having no distortion using an average value of the mixtures close to the temporary clean speech as in Eq. 9.

The final prior SNR calculator 220 obtains a final prior SNR applied to a second noise filter through the smoothing parameter of Eq. 11, and transfers the obtained final prior SNR to the final filter designer 222.

Then, the final filter designer 222 forms the second noise filter based on the Wiener filter with the final prior SNR, and outputs an improved final clean speech signal using the second noise filter formed by the clean speech estimation value as in Eq. 10.

FIG. 3 is a flowchart illustrating an operation procedure of the model-based distortion compensating noise reduction apparatus in accordance with the embodiment of the present invention.

Referring to FIG. 3, when a noisy speech signal is input to the model-based distortion compensating noise reduction apparatus 200, the frame divider 202 divides the input noisy speech signal into frames of predetermine length in step S300, and then delivers the frames to the noise estimator 204. The noise estimator 204 estimates noise components for the frames in step S302, and the speech absence probability calculator 206 calculates a speech absence probability by calculating an existence probability of the speech for the current frame using the estimated noise components in step S304.

Next, in order to improve the accuracy of the speech absence probability calculated to estimate dynamic noise, in step S306, the noise estimation updater 208 outputs a final estimation value of noise by updating a variance of a clean speech and noise for the frames using the smoothing parameters for the temporal frames determined based on the speech absence probabilities.

In step S308, the speech absence probability-based noise filter 212 forms a first noise filter based on the existence degree of noise over time by applying the previously obtained speech absence probability to the Wiener filter using the temporary prior SNR calculated from the final clean speech of the previous frame by the temporal prior SNR calculator 210, and the temporary clean speech is output through the first noise filter in step S310.

At this point, since the temporary clean speech is obtained by the first noise filter that is designed based on inaccurate noise, it contains a little distortion. Therefore, in step S312, the post probabilities for the mixtures of the speech GMM are calculated to recognize whether the temporary clean speech has a little distortion for the speech GMM DB 214 that cooperates with the post probability calculator 216.

In step S314, the clean speech estimator 218, since the temporary clean speech represents the probabilities for mixtures through the calculated post probability, a clean speech is estimated by compensation of distortion in which the temporary clean speech is moved to a clean speech distribution region using an average value of the mixtures whose probabilities are large.

In step S316, the final prior SNR calculator 220 obtains a final prior SNR applied to the second noise filter, and then, the final filter designer 222 forms the second noise filter based on the Wiener filter containing the final prior SNR in step S318 and outputs a final clean speech signal from the clean speech estimation value in step S320.

As described above, the model-based distortion compensating noise reduction apparatus and method for speech recognition in accordance with the present invention suggest a noise processing technology which can minimize distortion of an input speech signal while reducing the noise of the signal for speech recognition, in which it divides an input speech into frames of a predetermined length, estimates speech absence probabilities for the respective frames, and processes noise left in a temporary clean signal obtained by designing a filter for reducing dynamic noise based on the estimation result and distortion contained due to inaccurate estimation of dynamic noise, to thereby acquire a clean speech signal.

While the invention has been shown and described with respect to the embodiments, it will be understood by those skilled in the art that various changes and modification may be made without departing from the scope of the invention as defined in the following claims.

What is claimed is:

1. A model-based distortion compensating noise reduction apparatus for speech recognition, the apparatus comprising:
    a speech absence probability calculator for calculating the probability distribution for absence and existence of a speech by using the sound absence and existence information for frames;
    a noise estimation updater for estimating a more accurate noise component by updating the variance of the clean speech and noise for each frame;
    a speech absence probability-based noise filter for outputting a first clean speech through the speech absence probability transmitted from the speech absence probability calculator and a first noise filter;

a post probability calculator for calculating post probabilities for mixtures using a Gaussian mixture model (GMM) containing a clean speech in the first clean speech; and a final filter designer for forming a second noise filter and outputting an improved final clean speech signal using the second noise filter.

2. The apparatus of claim 1, further comprising a frame divider for converting the input speech signal into a digital signal and dividing the converted digital signal into the frames of a predetermined length.

3. The apparatus of claim 1, further comprising a noise estimator for estimating noise for the frames.

4. The apparatus of claim 1, wherein the first and second noise filters are based on a Wiener filter.

5. The apparatus of claim 1, wherein the first noise filter uses a clean speech obtained from a previous frame and a first prior signal-to-noise ratio calculated using a preset smoothing parameter value.

6. The apparatus of claim 1, wherein the second noise filter uses a clean speech calculated through a previous frame, a variance ratio of the clean speech to noise, and a second prior signal-to-noise ratio calculated using a preset smoothing parameter value.

7. The apparatus of claim 1, wherein the speech absence probability calculator calculates the probability distribution of absence and existence of a speech, and calculates the speech absence probability of the speech for the current frame based on the probability distribution.

8. The apparatus of claim 1, wherein the noise estimation updater outputs a final estimation value of noise by updating the variance of a clean speech and noise for the frames using the smoothing parameters for the temporal frames determined based on the speech absence probabilities.

9. The apparatus of claim 1, further comprising a clean speech estimator for moving the first clean speech to a clean speech distribution region to compensate for distortion by using an average value of mixtures larger than a preset value in the calculated post probability value.

10. The apparatus of claim 9, wherein the clean speech estimator for obtaining a clean speech estimation value from which distortion is removed, by moving the first clean speech to a speech distribution region having no distortion using the average value of the mixtures close to the first clean speech.

11. A model-based distortion compensating noise reduction method for speech recognition, the method comprising:

calculating the probability distribution for absence and existence of a speech by using the sound absence and existence information for the frames;

estimating a more accurate noise component by updating the variance of the clean speech and noise for each frame;

outputting a first clean speech through the speech absence probability transmitted from the speech absence probability calculator and a first noise filter;

calculating post probabilities for mixtures using a Gaussian mixture model (GMM) containing a clean speech in the first clean speech; and forming a second noise filter and outputting an improved second clean speech signal using the second noise filter using a clean speech estimation value obtained through the post probabilities.

12. The method of claim 11, further comprising converting the input speech signal into a digital signal, and dividing the converted digital signal into frames of a predetermined length.

13. The method of claim 11, wherein said calculating a speech absence probability includes estimating noise by calculating the probability distribution of absence and existence of a speech for the frames.

14. The method of claim 11, wherein the first and second noise filters are based on a Wiener filter.

15. The method of claim 11, wherein the first noise filter uses a clean speech obtained from a previous frame and a first prior signal-to-noise ratio calculated using a preset smoothing parameter value.

16. The method of claim 11, wherein the second noise filter uses a clean speech obtained from a previous frame, a variance ratio of the clean speech to noise, and a second prior signal-to-noise ratio calculated using a preset smoothing parameter value.

17. The method of claim 11, wherein said outputting a second clean speech signal further comprising moving the first clean speech to a clean speech distribution region to compensate for distortion by using an average value of mixtures larger than a preset value in the calculated post probability value.

18. The method of claim 17, wherein, by adding the average value of the mixtures to a preset weight, the clean speech estimation value from which distortion is removed is obtained by compensating for the first clean speech.

19. The method of claim 11, wherein said calculating a speech absence probability calculates the probability distribution of absence and existence of a speech, and calculates the speech absence probability of the speech for the current frame based on the probability distribution.

20. The method of claim 11, wherein said estimating a more accurate noise component outputs a final estimation value of noise by updating a variance of a clean speech and noise for the frames using the smoothing parameters for the temporal frames determined based on the speech absence probabilities.

* * * * *